US009227322B2

(12) United States Patent
Graca et al.

(10) Patent No.: US 9,227,322 B2
(45) Date of Patent: Jan. 5, 2016

(54) MULTI-ARM ROBOTIC PAINTING PROCESS SYNCHRONIZATION

(71) Applicant: Fanuc Robotics America Corporation, Rochester Hills, MI (US)

(72) Inventors: Randy A. Graca, Macomb, MI (US); Di Xiao, Rochester Hills, MI (US); Sai-Kai Cheng, Rochester Hills, MI (US)

(73) Assignee: Fanuc Robotics America Corporation, Rochester Hills, MI (US)

( * ) Notice: Subject to any disclaimer, the term of this patent is extended or adjusted under 35 U.S.C. 154(b) by 126 days.

(21) Appl. No.: 13/689,890

(22) Filed: Nov. 30, 2012

(65) Prior Publication Data

US 2014/0156068 A1   Jun. 5, 2014

(51) Int. Cl.
*B25J 9/16*    (2006.01)
*G05B 19/418*  (2006.01)

(52) U.S. Cl.
CPC .............. *B25J 9/1666* (2013.01); *B25J 9/1682* (2013.01); *G05B 19/4182* (2013.01); *G05B 2219/39135* (2013.01); *G05B 2219/45065* (2013.01); *Y10S 901/08* (2013.01); *Y10S 901/43* (2013.01)

(58) Field of Classification Search
CPC ... B25J 9/1666; B25J 9/1669; B05B 13/0431; G05B 19/4182
USPC ............. 700/248, 255; 198/341.01, 571, 575, 198/577
See application file for complete search history.

(56) References Cited

U.S. PATENT DOCUMENTS

| 3,744,032 | A | * | 7/1973 | Engelberger et al. ......... 700/159 |
| 4,086,522 | A | * | 4/1978 | Engelberger et al. .... 318/568.13 |
| 4,170,751 | A | * | 10/1979 | Stricker ........................ 318/563 |
| 4,448,821 | A | * | 5/1984 | Buschor ........................ 427/424 |
| 4,830,882 | A | * | 5/1989 | Ichinose et al. ............... 427/424 |
| 5,429,682 | A | * | 7/1995 | Harlow et al. ................. 118/681 |
| 5,724,489 | A | * | 3/1998 | Yamamoto et al. ........... 700/245 |
| 2006/0042914 | A1 | * | 3/2006 | Wiedemann et al. ......... 198/575 |
| 2008/0314887 | A1 | * | 12/2008 | Stoger et al. ............. 219/137 R |
| 2011/0166703 | A1 | * | 7/2011 | Byrne ........................... 700/246 |

* cited by examiner

*Primary Examiner* — Khoi Tran
*Assistant Examiner* — Ryan Rink
(74) *Attorney, Agent, or Firm* — Fraser Clemens Martin & Miller LLC; William J. Clemens

(57) ABSTRACT

Painting robots processing a part moving on a conveyor are synchronized by creating for each of the robots a master sequence of computer program instructions for a collision-free movement of robots along associated master sequence paths relative to the moving part, each of the master sequence paths including positions of the associated robot and the conveyor at pre-defined synchronization points, and running each of the master sequences on a controller connected to the associated robot to move the associated robot and comparing a current path of the associated robot and the conveyor against the master sequence path. The method further includes operating the controllers to adjust the current paths based on the comparison between the master sequence path and the current path, and operating the controllers to request a conveyor motion hold as necessary to facilitate synchronization between movement of the robots and the conveyor.

11 Claims, 4 Drawing Sheets

MULTI-ARM ROBOTIC PAINTING PROCESS SYNCHRONIZATION

FIELD OF THE INVENTION

This invention relates to the synchronization of multiple robots painting objects on a moving conveyor and, in particular, to the synchronization of the motion of the multiple robot arms for painting in a workcell wherein the object to be painted travels along a moving conveyor in the presence of multiple, random conveyor stop and restart events.

BACKGROUND OF THE INVENTION

Typical existing painting systems utilize Wait/Release commands with explicitly specified conveyor position or location statements. This may be adaptable to helping robots get back in synchronization, but not in all cases. The burden is on the end user to determine how to place and manage the instructions, making it a fairly complex operation requiring expert knowledge. Other examples of prior art include systems using interference zones, or systems using a master/slave relationship between robots (for example, coordinated motion) to keep the arms from moving near to each other. As another example, a "Conveyor Sync" algorithm is used that explicitly stops and restarts the robot coincidentally with the conveyor stop and start events, and/or varies robot speed directly proportional to conveyor speed changes.

The prior art systems have the following shortcomings:
(a) Explicit Conveyor Location Statements or Wait/Release statements do not address cases where robots stop in between the explicitly defined conveyor locations. They also place a high burden of expertise on the end user to make the systems work.
(b) Coordination Motion and other master/slave type algorithms involve more programming complexity, and may not be feasible in cases where the conveyor is controlled by an external entity.
(c) Conveyor Sync can impede paint quality in that TCP speed may not be always properly maintained relative to the object, and trigger points (i.e. where the paint gun is turned on or off relative to the object) cannot be as easily defined.

SUMMARY OF THE INVENTION

The painting robot synchronization method according to the invention overcomes the shortcomings of the prior art systems as follows:
(a) The robot arms will automatically synchronize with each other and with the conveyor based on a paint stroke definition, which is something the end user already understands and programs.
(b) No additional programming of robot motion or control of the conveyor motion is required.
(c) The robot arms will maintain the proper TCP speed relative to the object. The robot arms also will be able to continue a painting stroke to a pre-designated paint gun off location in the event of conveyor stops or slowdowns.

The method according to the invention of synchronizing painting by multiple robotic manipulators which process an object that is moving along a conveyor comprises the steps of:
a. Recording of a master sequence in which an optimum collision-free path is recorded, including robotic manipulator and conveyor positions together;
b. The master sequence consists of robotic manipulator and conveyor positions at pre-defined synchronization points;
c. Run-time software compares the current production path motion against the master sequence;
d. The run-time software to affect motion planning is based on the comparison between the master sequence and the current path; and
e. The run-time software requests a conveyor hold as necessary to facilitate synchronization.

A method of synchronizing a plurality of painting robots operating in a workcell to process a part that is moving along a conveyor comprising the steps of:
creating for each of the painting robots a master sequence of computer program instructions for a collision-free movement of each of the painting robots along an associated master sequence path relative to the part moving along the conveyor, each of the master sequence paths including positions of the associated painting robot and the conveyor at pre-defined synchronization points;
running each of the master sequences on a controller connected to the associated painting robot to move the associated painting robot and comparing a current path of the associated painting robot and the conveyor against the master sequence path;
operating the controllers to adjust the current paths based on the comparison between the master sequence path and the current path; and
operating the controllers to request a conveyor motion hold as necessary to facilitate synchronization between movement of the painting robots and the conveyor.

Synchronization between robotic arms in a zone according to the invention is achieved through the following steps:
(a) The robot programmer programs all devices in a cell to operate as desired (for example, collision free with no places where spray patterns can overlap each other);
(b) A master sequence is created by running a simulated production job (also known as a "ghost job") with a simulated conveyor and simulated part detect signal, and all paint applicators disabled, or by running the job in an offline simulation program, or by running a production job;
(c) The master sequence includes a series of program instructions similar to a computer program which define actions to be performed by the robot, and also includes data learned from running the job as described in (b);
(d) Data from the master sequence is stored in Process TP programs;
(e) The sequence must be re-generated when changes are made to motion in Process TPs;
(f) Gun=ON and/or Gun=OFF instructions are used to define "strokes", with Gun=ON instructions representing the synchronization points;
(g) Gun=ON/OFF instructions are made available to Opener robots (door, hood, trunk) as well as Painter robots, with the same TCP extreme behavior;
(h) For each robot arm individually, as it reaches a Gun=ON instruction, a decision is made based on the master sequence data, which is itself based on the offset of the object on the conveyor with respect to the robot world zero:
(i) If the offset is within tolerance, the robot can continue motion execution and the conveyor can also continue to move;
(j) If the offset is lagging the master sequence, the robot will wait until the offset arrives within tolerance and the robot motion execution will resume;

(k) If the offset is ahead of the master sequence, the appropriate digital output will be generated to stop the conveyor until the offset arrives within tolerance and then the digital output will be cleared to allow conveyor motion to resume; and (l) Separate tolerances will be available for the "lagging" and "ahead" cases mentioned above, and these separate tolerances can be changed on the fly from within the user program.

(m) The approach according to the invention provides multiple benefits for the customer and/or end user:

(n) Allows for robots to be programmed using the same booth space or same "spray zone" for paint without risk of collision due to conveyor speed fluctuations. For example, two hood painting robots could be programmed to paint all the way to the centerline of the vehicle across the car and would not be able to "paint each other" in the middle or collide.

(o) The validation of complex moving-line cells would be significantly simpler. Robot programmers would only need to consider the worst case amount of time that a robot would run after a conveyor stop as opposed to trying to validate multiple conveyor stop occurrences.

(p) Production will be more repeatable because the robots would always process the vehicle in the same location in the booth, independent of conveyor stops or speed fluctuations.

(q) It has the potential to reduce booth size by eliminating the need to "stagger" robot motion between different arms.

DESCRIPTION OF THE DRAWINGS

The above as well as other advantages of the present invention will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps may not be necessary or critical.

Figure 1:
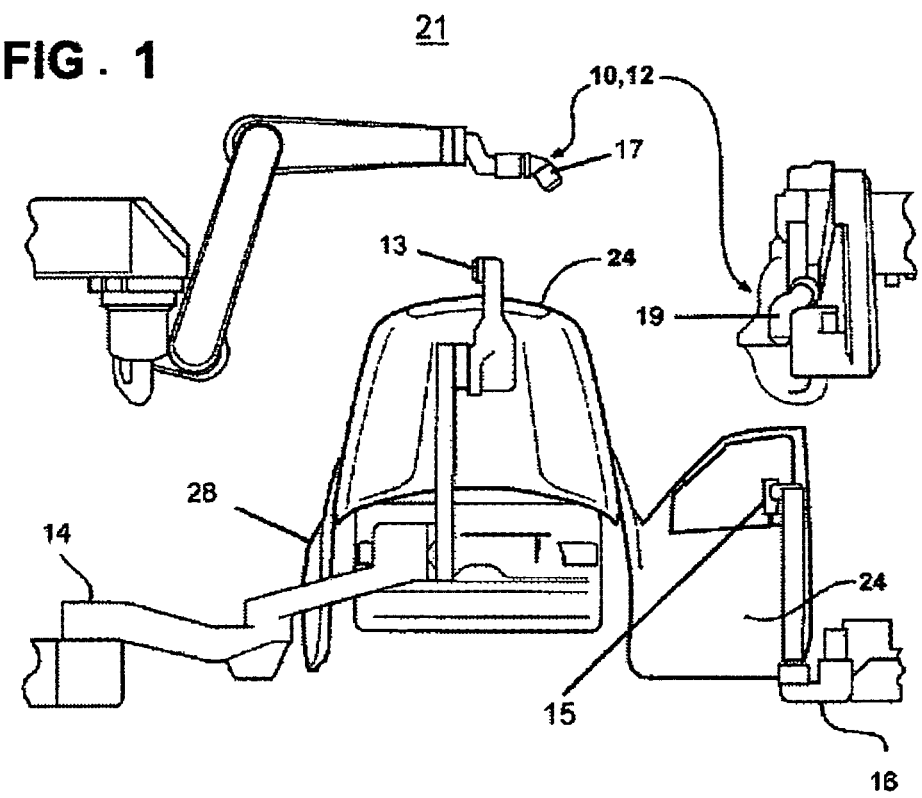
FIG. 1 illustrates a partial, schematic view of a paint spray booth with painting and handling/opener robots synchronized in accordance with the method of the invention.
Figure 2:
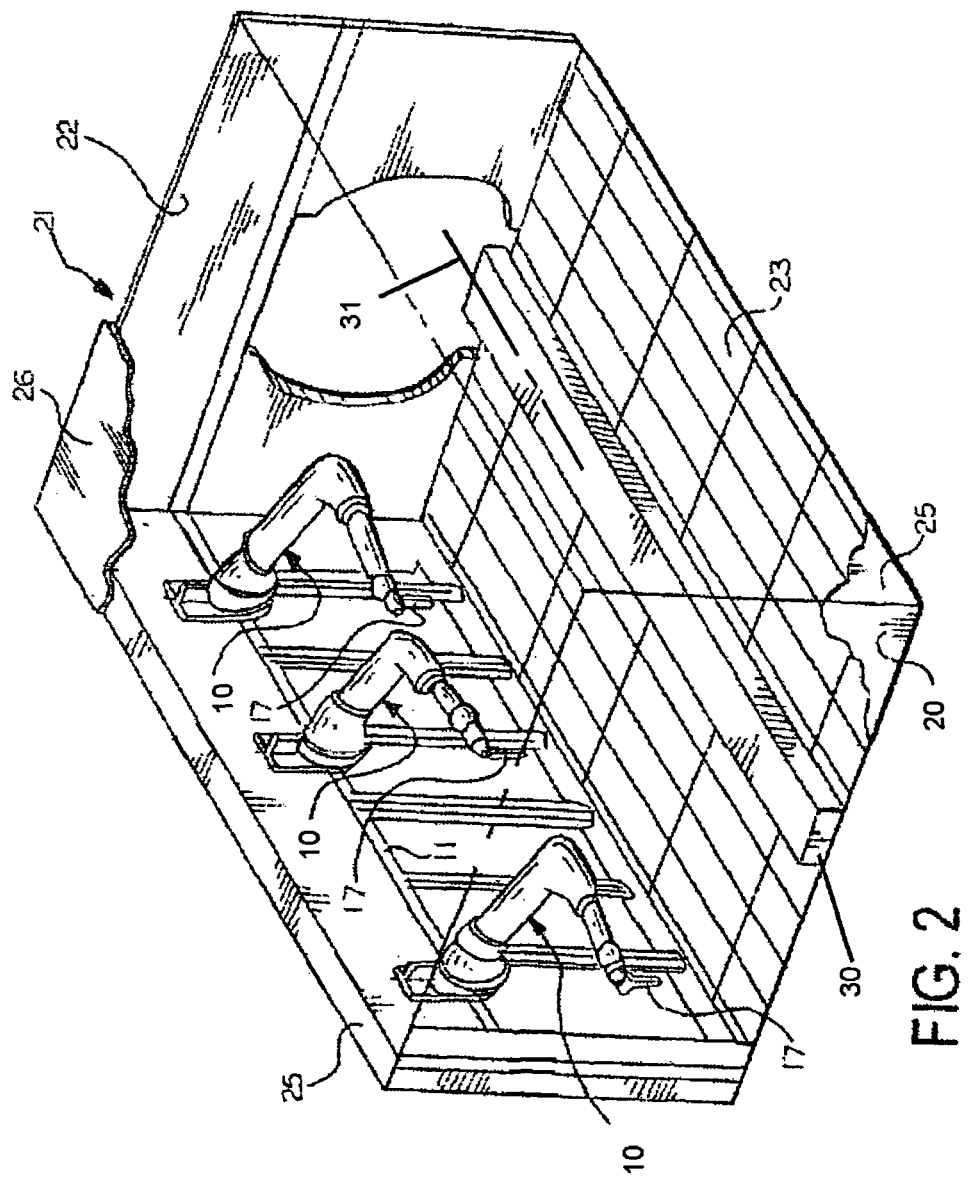
FIG. 2 is fragmentary perspective view of the paint spray booth shown in FIG. 1.

With reference to FIGS. 1 and 2, a spray or painting booth 21 is illustrated depicting an arrangement of painting robots 10, 12 and handling robots 14, 16 for performing operations on an object such as a vehicle 28. In FIG. 1, the painting robots 10, 12 each have a robot arm with a paint applicator 17, 19 respectively. The handling robots 14, 16 each have a robot arm with a handling tool 13, 15 respectively. The handling robots 14, 16 assist the painting robots 10, 12 by one of grasping, opening, holding, and closing doors, hoods, deck lids, and/or hatches (referred to herein as swing metal panels 24) to expose an interior compartment of the vehicle 28 so that one of the painting robots 10, 12 can paint the interior surfaces of the vehicle 28 according to an automatic painting process. It should be appreciated that the system and method of the present disclosure may be employed with the painting robots 10, 12 having the handling tools 13, 15, and therefore capable of acting as both the painting robots and the handling robots 14, 16, as desired. It should be further appreciated that the specific features herein described with respect to use of the handling robots 14, 16 for door openings, for example, may equally apply to other swing metal panels such as hoods and hatches.

As shown in FIG. 2, a plurality of the painting robots 10 is mounted on a side wall 25 of the booth 21. Three such robots 10 are shown and each can be a robotic four axis articulated arm terminated at a free end by the paint applicator 17. The arm includes a shoulder axis, an elbow axis, a wrist rotating axis and a wrist tilting axis. Although a rotary bell atomizer is shown as the paint applicator 17, any known device such as a spray gun could be used. Preferably, the painting devices 10, 12 are mounted in opposed pairs for simultaneously painting opposite surfaces of the object 28 (FIG. 1) such an automobile body or the like (not shown) moved through the booth 21 on a conveyor 30 along an axis 31.

The painting booth 21 includes a front or entrance wall 20, a rear or exit wall 22, a lower wall or floor 23, a pair of the side walls 25 and a top wall or roof 26. The right side wall 25, the front wall 20 and the top wall 26 are cut away to permit the interior of the booth 21 to be seen. The painting robots 10, 12 are disposed in an upper portion of the paint booth 21 on the side walls 25. A frame rail 11 extends along an interior surface of the left side wall 25. The frame rail 11 can be attached to the side wall 25 by any suitable means. A second one of the frame rails 11 (not shown) is positioned on the opposite interior surface of right side wall 25 for attaching the painting robots 12. Alternatively, the frame rails 11 can be supported on columns or posts extending vertically upwardly from the floor 23.

Figure 3:
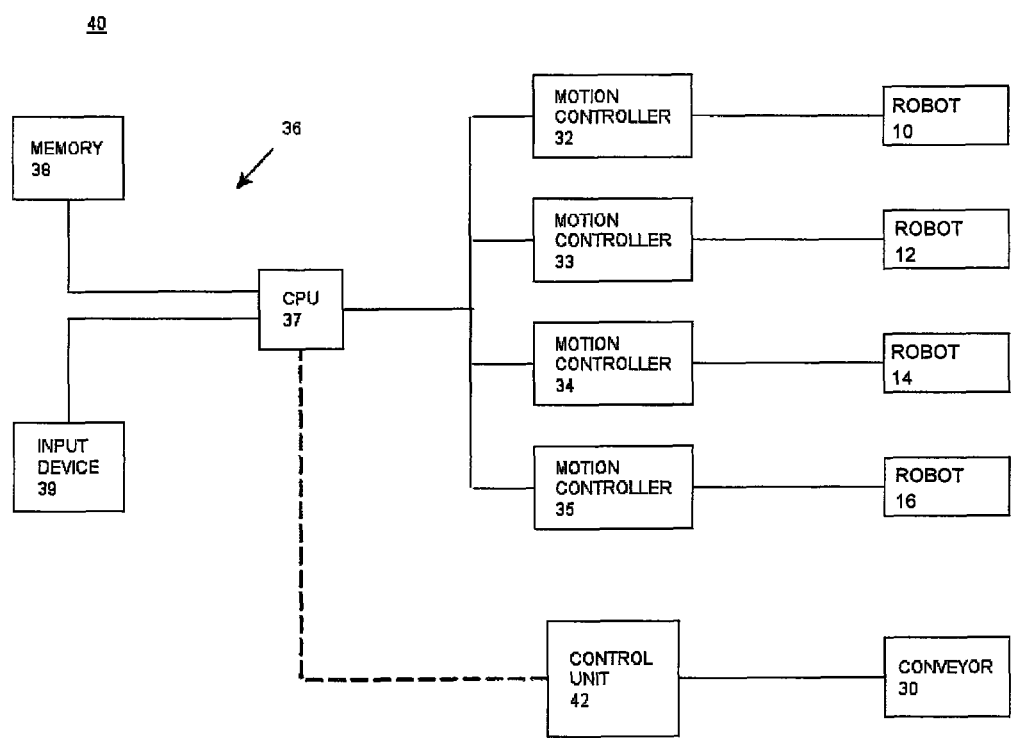
FIG. 3 is a schematic block diagram of the control system for the robots shown in FIGS. 1 and 2.

There is shown in FIG. 3 a motion control system 40 for the robots shown in FIG. 1. Each one of a plurality of motion controllers 32, 33, 34, 35 is connected to an associated one of the robots 10, 12, 14, 16 to control the robot motions during the painting of the vehicle 28. A robotic system controller 36 is connected to the motion controllers 32, 33, 34, 35 and includes a processor (CPU) 37 for executing program instructions stored in a memory 38 connected to the CPU 37. Also connected to the CPU 37 is a user interface or input device 39, such as a teach pendant, for allowing a user to input information to the controller 36. Instead of a teach pendant, the user interface device can be the keyboard of a PC having a CRT display or any other input device known to one of skill in the art. The controllers 32, 33, 34, 35, 36 are connected by a bus 41 for bi-directional communication. Additional ones of the robots 10, 12, 14, 16 located in the painting booth 21 can be connected to another similar controller 36 in a similar manner, which could have its own input device or share an input device with another robot system controller, or both. There is also the conveyor 30 with associated control unit 42 to which the CPU 37 has at least sufficient access to read status information and request a conveyor hold.

The motion control system 40 operates to provide "Path Synchronization" for a robotic painting system. "Path Synchronization" in this context means that the relative positions of the robot arms in their production cycle is maintained regardless of changes in the conveyor speed, and/or conveyor stop/restart events. The synchronization is achieved by learning a "master sequence" of how the robot arms being synchronized execute the production job under ideal conditions. The data from this master sequence is stored by the application in the PROCESS TP programs themselves, so that at playback the application provides this data to the motion system, and the motion control system 40 will take appropriate synchronization action. Each robot arm synchronizes itself with the conveyor position; hence, synchronization between arms is achieved by virtue of the fact that all arms synchronize to the same conveyor.

There are three modes for the synchronization software: the Learn Mode; the Playback Mode; and the Disabled Mode. The Learn Mode and the Playback Mode are illustrated in the flow diagram of FIG. 4. In the Learn Mode, the part offset data is recorded at each synchronization point and stored in the corresponding PROCESS TP program line data. The "synchronization point" is defined as a motion line containing a Gun=ON instruction. In Playback Mode, the data is read from the PROCESS TP program lines that have been defined as synchronization points (i.e. that have attached Gun=ON instructions), and the data read is used to either hold the robot motion or hold the conveyor, depending on actual part offset. In the Disabled Mode, the synchronization feature is globally disabled.

Figure 4:
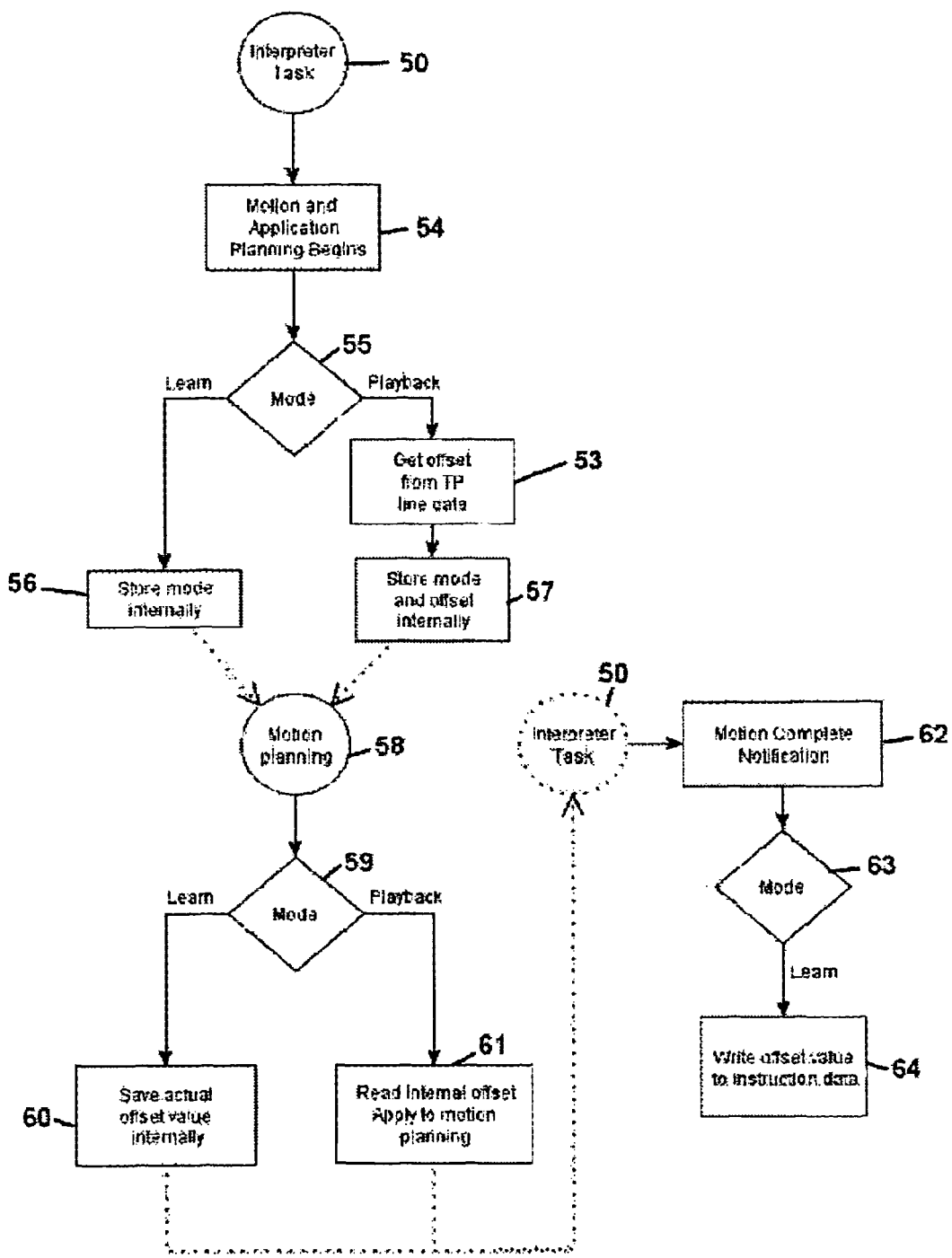
FIG. 4 is a flow diagram of a Program Interpreter task for each of the robots according to the invention.

There is shown in FIG. 4 a Program Interpreter task 50 for each of the painting robots that executes the TP program taught by the user. The synchronization feature impacts the motion and application planning of the motion lines in the TP program 54. During motion planning 58, the Learn Mode 55 is set in an internal motion data structure 56 associated with the TP program line. A tracking feature checks either the destination position or the TCP Extreme (if active) against a tracking boundary, and either waits or continues planning depending on the result of this check. This check requires the calculation of the part offset from an output of a detect switch associated with the conveyor.

In the path synchronization Learn Mode 59, when a TP program line containing a Gun=ON instruction is being planned and the boundary condition is determined to have been satisfied for this line, the calculated part offset is stored in an internal motion data structure 60 so that it can be retrieved later on by the application and stored in the PROCESS TP program line data.

When the TP program motion line containing the Gun=ON instruction is executed 62 in the Learn Mode 63, the application retrieves the internally stored offset data and writes the offset value to the instruction line data 64.

During the Playback Mode 55, when a TP line is being planned, the application retrieves the offset data from the TP line 53. The Playback Mode 55 and the offset are set in an internal motion data structure 57 associated with the TP program line. Then the offset value from the TP line data is compared with the actual current part offset 61 to determine whether to wait or continue planning.

Also during motion planning, the variables for the existing outbound margin function in line tracking will be set, so that if the robot is actually behind the expected conveyor position, the digital output can be asserted to hold the conveyor.

During the Disabled Mode, all the functions mentioned above are bypassed.

Finally, a user interface (input device 39) is provided for the end user to associate a margin, in millimeters (for example) of conveyor travel, to be associated with holding the robot motion or holding the conveyor when synchronizing.

The primary abnormal (error) condition that needs to be considered is the case in which Learn Mode is active, but a "clean run" is not obtained. In this scenario, a warning is posted at the end of the job. Also to be considered is the case in which the end user makes a change to a PROCESS TP program that potentially affects motion and/or timing. This case is treated the same as the case in which the "clean run" failed. To detect this case, the "Last Processed Date" item in the TP program header is used and compared with the "Last Modified Date" of the TP program. The date stored in the "Last Processed Date" field would represent the date/time at which a successful "clean run" had occurred to update sync data. When a "clean run" is not obtained, then the "Last Processed Date" field is not updated.

In both modes, the above handling of the offset data is applied only at the Gun=ON instruction, which in the Paint Application represents the synchronization point because it defines the paint stroke.

When in the Learn Mode, there are two scenarios during JOB execution which should make the recorded data invalid: Conveyor stop during JOB execution; and Fault (Estop) during JOB execution. Once one of these events occurs, if the system is still in the Learn Mode, any subsequent motions should not record data, and the "Last Processed Date" field should not be updated. Then at the end of the JOB, a warning alarm is posted to indicate that synchronization in the Learn Mode did not complete successfully.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of synchronizing at least two painting robots to process a part that is moving along a conveyor comprising the steps of:
    creating for each of the painting robots a master sequence of computer program instructions for a collision-free movement of each of the painting robots along an associated master sequence path relative to the part moving along the conveyor, each of the master sequence paths including positions of the associated painting robot and the conveyor at pre-defined synchronization points, each of the synchronization points being a selected motion line in the master sequence;
    running each of the master sequences on a controller connected to the associated painting robot to move the associated painting robot;
    comparing a current path of the associated painting robot and the conveyor against the master sequence path;
    operating the controllers to adjust the current paths based on the comparison between the master sequence path and the current path by writing to the master sequences of computer program instructions; and
    operating the controllers to request a conveyor motion hold as necessary to facilitate synchronization between movement of the painting robots and the conveyor.

2. The method according to claim 1 including performing the steps to operate the painting robots collision free with no places where spray patterns of the painting robots can overlap each other in air.

3. The method according to claim 1 including performing the step of creating a master sequence of computer program instructions by running a ghost job with a simulated conveyor and all paint applicators associated with the painting robots disabled.

4. The method according to claim 1 including storing data from each of the master sequences in programs to be run by the associated controller.

5. The method according to claim 4 including re-generating each of the master sequences in response to a change in a motion instruction in one of the associated programs.

6. The method according to claim 1 wherein the computer program instructions include pre-defined synchronizing instructions that identify and select the selected motion lines for the synchronization points.

7. The method according to claim 6 including providing the pre-defined synchronizing instructions to at least one opener robot to facilitate synchronization between movement of the opener robot and the conveyor.

8. The method according to claim 6 wherein during running of the master sequence the controller responds to the pre-defined synchronizing instructions by checking an offset of the part on the conveyor with respect to a robot world zero and continues motion of the associated painting robot and the conveyor if the offset is within a predetermined tolerance.

9. The method according to claim 8 wherein if the offset is lagging the master sequence, the controller causes the associated painting robot to wait until the offset arrives within the tolerance and then resumes motion of the associated painting robot.

10. The method according to claim 8 wherein if the offset is ahead of the master sequence, the controller causes the conveyor to stop until the offset arrives within tolerance and then resumes motion of the conveyor.

11. The method according to claim 8 wherein the predetermined tolerance has different values for the offset lagging the master sequence and the offset being ahead of the master sequence.

* * * * *